United States Patent
Li et al.

(10) Patent No.: US 12,205,243 B2
(45) Date of Patent: Jan. 21, 2025

(54) HIGH-RESOLUTION HYPERSPECTRAL COMPUTATIONAL IMAGING METHOD AND SYSTEM AND MEDIUM

(71) Applicant: Hunan University, Changsha (CN)

(72) Inventors: Shutao Li, Changsha (CN); Renwei Dian, Changsha (CN); Anjing Guo, Changsha (CN); Xudong Kang, Changsha (CN); Bin Sun, Changsha (CN); Leyuan Fang, Changsha (CN); Ting Lu, Changsha (CN)

(73) Assignee: Hunan University, Changsha (CN)

( * ) Notice: Subject to any disclaimer, the term of this patent is extended or adjusted under 35 U.S.C. 154(b) by 373 days.

(21) Appl. No.: 17/871,943

(22) Filed: Jul. 24, 2022

(65) Prior Publication Data

US 2022/0366536 A1 Nov. 17, 2022

Related U.S. Application Data

(63) Continuation of application No. PCT/CN2021/101763, filed on Jun. 23, 2021.

(30) Foreign Application Priority Data

Apr. 13, 2021 (CN) .......................... 202110395614.4

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC ... G06T 3/4053; G06T 3/4046; G06T 3/4076; G06T 2207/20081; G06N 3/045
See application file for complete search history.

(56) References Cited

U.S. PATENT DOCUMENTS

| | | | | |
|---|---|---|---|---|
| 11,948,274 B1 * | 4/2024 | Vavilala | ................. | G06N 3/045 |
| 2017/0347110 A1 * | 11/2017 | Wang | ................... | H04N 19/142 |

(Continued)

FOREIGN PATENT DOCUMENTS

| | | | | |
|---|---|---|---|---|
| CN | 101826160 A | | 9/2010 | |
| CN | 110322402 A | * | 10/2019 | ........... G06T 3/4023 |

(Continued)

OTHER PUBLICATIONS

Learning Spatial-Spectral Prior for Super-Resolution of Hyperspectral Imagery 2020 (Year: 2020).*

(Continued)

*Primary Examiner* — Nizar N Sivji
(74) *Attorney, Agent, or Firm* — Nitin Kaushik

(57) ABSTRACT

The present invention discloses a high-resolution hyperspectral computational imaging method and system and a medium. The method of the present invention comprises: conducting spectral upsampling on an input RGB image Y to obtain an initial hyperspectral image $X_0$; and inputting the initial hyperspectral image $X_0$ into a pre-trained deep convolutional neural network guided by an imaging model, and conducting iteration computation to obtain a hyperspectral image X. The present invention can effectively achieve reconstruction of the RGB image to the high-resolution hyperspectral image and has the advantages of high reconstruction precision, high computational efficiency, little memory consumption and strong generalization ability.

20 Claims, 6 Drawing Sheets

(56) References Cited

U.S. PATENT DOCUMENTS

| | | | |
|---|---|---|---|
| 2018/0075581 A1* | 3/2018 | Shi | G06N 3/045 |
| 2019/0311230 A1 | 10/2019 | Mahapatra et al. | |
| 2021/0127101 A1* | 4/2021 | Roh | H04N 23/55 |
| 2022/0261959 A1* | 8/2022 | Zhang | G06T 3/4053 |
| 2023/0177641 A1* | 6/2023 | Song | G06T 3/4053 |
| | | | 382/157 |
| 2024/0071573 A1* | 2/2024 | Jaganathan | G06N 3/045 |

FOREIGN PATENT DOCUMENTS

| | | |
|---|---|---|
| CN | 110458777 A | 11/2019 |
| CN | 111160300 A | 5/2020 |
| CN | 111579506 A | 8/2020 |
| CN | 111678599 A | 9/2020 |

OTHER PUBLICATIONS

A Survey on the New Generation of Deep Learning in Image Processing—2019.*

Deep Learning for Pixelwise Classification of Hyperspectral Images—2017 (Year: 2017).*

TGV Upsampling: A Making-Up Operation for Semantic Segmentation 2019 (Year: 2019).*

Lightweight Modules for Efficient Deep Learning based Image Restoration—2015 (Year: 2015).*

* cited by examiner

| Method | SAM | RMSE | UIQI | SSIM |
|---|---|---|---|---|
| Arad | 20.8999 | 18.7450 | 0.6080 | 0.7935 |
| HSCNN-R | 11.3185 | 5.0144 | 0.7563 | 0.9564 |
| DFMN | 8.9322 | 4.3646 | 0.8394 | 0.9774 |
| AWAN+ | 8.6389 | 4.6299 | 0.8638 | 0.9815 |
| SSRNet | 8.2700 | 3.9426 | 0.8651 | 0.9829 |

FIG. 5

| Method | SAM | RMSE | UIQI | SSIM |
|---|---|---|---|---|
| Arad | 16.8365 | 14.9593 | 0.5542 | 0.7992 |
| HSCNN-R | 4.9337 | 3.6007 | 0.8627 | 0.9755 |
| DFMN | 6.3399 | 4.9146 | 0.8323 | 0.9644 |
| AWAN+ | 4.4015 | 3.1036 | 0.8720 | 0.9788 |
| SSRNet | 4.3581 | 2.9556 | 0.8762 | 0.9795 |

FIG. 6

HIGH-RESOLUTION HYPERSPECTRAL COMPUTATIONAL IMAGING METHOD AND SYSTEM AND MEDIUM

CROSS-REFERENCE TO RELATED APPLICATIONS

The application claims priority to Chinese patent application No. 202110395614.4, filed on Apr. 13, 2021, the entire contents of which are incorporated herein by reference.

TECHNICAL FIELD

The present invention relates to a high-resolution hyperspectral computational imaging technology, in particular to a high-resolution hyperspectral computational imaging method and system and a medium.

BACKGROUND

The hyperspectral computational imaging technology can obtain image information of tens or hundreds of spectral bands at the same time; and rich spectral information facilitates accurate recognition on matters in a scene. Therefore, the hyperspectral computational imaging technology is widely applied to many fields of earth observation, military monitoring, environment monitoring, geological prospecting, medical tests, face recognition and the like. However, due to limitation of an optical imaging system, an existing optical imaging system difficultly obtain a high-resolution hyperspectral image directly. Meanwhile, due to high cost of spectral imaging equipment, application of the hyperspectral image is greatly limited. In another aspect, an existing imaging system may obtain a high-resolution RGB image, and the cost of an RGB camera is low. It is an economic and efficient way of obtaining the high-resolution hyperspectral image through the RGB image; and this process is usually called as spectral superresolution.

At present, a popular spectral superresolution method may be divided into a method based on model optimization and a method based on a deep convolutional neural network. In the method based on model optimization, assumed that the RGB image may be sampled under the hyperspectral image. In this kind of method, through maximum a posteriori estimation, the hyperspectral image is estimated by combining an imaging model and given image prior information. However, these pieces of prior information given in advance cannot well describe the characteristics of the image, which easily causes distortion of spectra and spatial information.

The deep convolutional neural network can effectively learn the prior information of the image; the deep convolutional neural network based on a data-driven mode has already been widely applied to spectral superresolution; and this kind of method pre-trains the network through the RGB image and the corresponding hyperspectral image, so that optimal parameters are obtained. However, this kind of method always ignores the imaging model in spectral superresolution, which limits the performance of the convolutional neural network.

SUMMARY

The technical problems to be solved by the present invention is as follows: aiming to the above problems in the prior art, provided is a high-resolution hyperspectral computational imaging method and system and a medium. The present invention can effectively achieve reconstruction of the high-resolution hyperspectral image from the RGB image and has the advantages of high reconstruction precision, high computational efficiency, little memory consumption and strong generalization ability.

To solve the above technical problems, the present invention employs the following technical solution: A high-resolution hyperspectral computational imaging method comprises:

1) conducting spectral upsampling on an input RGB image Y to obtain an initial hyperspectral image $X_0$; and 2) inputting the initial hyperspectral image $X_0$ into a pre-trained deep convolutional neural network guided by an imaging model, and conducting iteration computation to obtain a hyperspectral image X.

Optionally, in the step 1), a function expression of the initial hyperspectral image $X_0$ obtained by spectral upsampling on the input RGB image Y is as follows:

$$X_0 = R^\dagger * Y \qquad (1)$$

In the above expression, $R^\dagger$ is a generalized inverse of a spectral response function R.

Optionally, in the step 2), the deep convolutional neural network guided by an imaging model is formed by a plurality of modules of a same structure; the plurality of modules are in cascade connection; input of each module comprises the initial hyperspectral image $X_0$ and an upsampling result of a previous module or the initial hyperspectral image $X_0$; and the hyperspectral image X is obtained from output of the last module.

Optionally, each module is formed by a hyperspectral prior learning (HPL) module and an imaging model guidance (IMG) module; each hyperspectral prior learning (HPL) module is used for learning prior features of the upsampling result of the previous module or the initial hyperspectral image $X_0$; each imaging model guidance (IMG) module is used for optimizing the learned features based on the input initial hyperspectral image X) and the prior features output by the hyperspectral prior learning (HPL) module according to the imaging model.

Optionally, each hyperspectral prior learning (HPL) module is of a five-layer structure formed by sequentially connecting a 3×3 first convolutional layer, a nonlinear rectified linear unit, a channel attention mechanism, a 3-3 second convolutional layer and a spatial attention mechanism; each channel attention mechanism comprises a 1×1 convolutional operation, a nonlinear normalization unit, a linear arithmetic operation and a plurality of rectified linear units; and the 1×1 convolutional operation, the nonlinear normalization unit, the linear arithmetic operation and the plurality of rectified linear units are sequentially connected.

Optionally, in the step 2), the step of conducting iteration computation to obtain the hyperspectral image X comprises:

2.1) initializing a number of iterations to be 1 and values of parameters in the deep convolutional neural network guided by the imaging model and a penalty factor $\mu_t$ of a $t^{th}$ iteration.

2.2) Learning the prior features of the upsampling result of the previous module or the initial hyperspectral image $X_0$ by the hyperspectral prior learning (HPL) module in the $t^{th}$ module firstly, optimizing the learned features based on the input initial hyperspectral image $X_0$ and the prior features output by the hyperspectral prior learning (HPL) module according to the imaging model by the imaging model guidance (IMG) module, and updating the hyperspectral image X obtained by the $t^{th}$ iteration.

2.3) Judging whether the condition that the number t of iterations is equal to a preset threshold T is satisfied or not; if the condition is satisfied, outputting the hyperspectral image X obtained by the $t^{th}$ iteration as a final result; or otherwise, adding 1 to the number t of iterations, and jumping to execute the step 2.2) for continuous iteration.

Optionally, the hyperspectral prior learning (HPL) module learns the prior features of the upsampling result of the previous module or the initial hyperspectral image $X_0$, which means that: a variable G is introduced and is updated by executing the expressions (3)-(4) to learn the upsampling result of the previous module or the initial hyperspectral image $X_0$.

$$G_{t+1} = \mathrm{argmin}_G \lambda \emptyset(G) + \mu_t \|G - X_t\|_F^2 \qquad (2)$$

$$X_{t+1} = \mathrm{argmin}_X \|Y - FX\|_F^2 + \mu_t \|G_{t+1} - X\|_F^2 \qquad (3)$$

$$\mu_{t+1} = \gamma \mu_t \qquad (4)$$

In the expressions, $G_{t+1}$ is a value of the introduced variable in $t+1^{th}$ iteration; G is the introduced variable; $\lambda$ is a weighting parameter; $\emptyset(G)$ is a regularization term of the introduced variable G; $\mu_t$ is a penalty factor of $t^{th}$ iteration; $\mu_{t+1}$ is a penalty factor of $t+1^{th}$ iteration; $X_t$ is a hyperspectral image obtained by the $t^{th}$ iteration; $X_{t+1}$ is a hyperspectral image obtained by the $t+1^{th}$ iteration; Y represents an RGB image; F is a spectral response function; X represents a hyperspectral image; and $\gamma$ is an update coefficient of the penalty factor.

Optionally, a function expression that each hyperspectral prior learning (HPL) module is used for optimizing the learned features based on the input initial hyperspectral image $X_0$ and the prior features output by the hyperspectral prior learning (HPL) module according to the imaging model is as follows:

$$X_{t+1} = (F^T F + \mu_t I)^{-1} (F^T Y + \mu_t G_{t+1}) \qquad (5)$$

In the expression, $X_{t+1}$ is a result obtained by optimizing the learned features according to the imaging model; F is the spectral response function; I is a unit matrix, Y is the input RGB image; $\mu_t$ is a penalty factor in the $t^{th}$ iteration; and $G_{t+1}$ is a value of the introduced variable in the $t+1^{th}$ iteration.

In addition, the present invention further provides a high-resolution hyperspectral computational imaging system, comprising a microprocessor and a memory which are connected to each other; the microprocessor is programmed or configured to execute the steps of the high-resolution hyperspectral computational imaging method; or the microprocessor is programmed or configured to execute the steps of the high-resolution hyperspectral computational imaging method with a neural network acceleration processor together.

In addition, the present invention further provides a computer readable storage medium, and computer programs programmed or configured to execute the high-resolution hyperspectral computational imaging method are stored in the computer readable storage medium.

Compared with the prior art, the present invention has the following advantages:

1. The present invention conducts spectra upsampling on the input RGB image Y to obtain the initial hyperspectral image $X_0$, inputs the initial hyperspectral image $X_0$ into the pre-trained deep convolutional neural network guided by the imaging model, obtains the hyperspectral image X through iteration computation, establishes a relationship between the RGB image Y and the hyperspectral image X through the deep convolutional neural network guided by the imaging model and obtains the hyperspectral image X through iteration computation. The present invention can effectively construct the high-resolution hyperspectral image from the RGB image, can effectively obtain the hyperspectral image with a high spatial resolution from the RGB image with the high spatial resolution and has the advantages of high reconstruction precision, high computational efficiency, little memory consumption and strong generalization ability.

2. The present invention establishes the relationship between the RGB image Y and the hyperspectral image X through the deep convolutional neural network guided by the imaging model and employs the imaging model to guide the learning process of the deep convolutional neural network, which significantly lowers the numbers of the parameters of a neural network and improves the learning performance of the neural network.

3. When conducting different types of hyperspectral imaging, the present invention has very strong universality and robustness without changing the structure and the parameters of the network.

BRIEF DESCRIPTION OF DRAWINGS

FIG. 5 is an objective performance index comparison diagram of a method according to an embodiment of the present invention and four imaging methods on a CAVE data set.

FIG. 6 is an objective performance index comparison diagram of a method according to an embodiment of the present invention and four imaging methods on a Harvard data set.

DETAILED DESCRIPTION OF THE EMBODIMENTS

Figure 1:
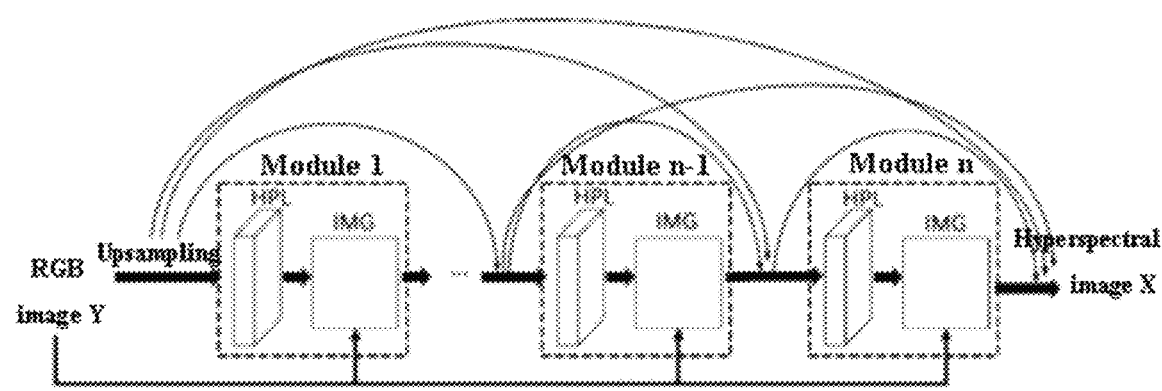
FIG. 1 is a basic flow diagram of a method according to an embodiment of the present invention.

As shown in FIG. 1, a high-resolution hyperspectral computational imaging method of this embodiment comprises:

1) conducting spectral upsampling on an input RGB image Y to obtain an initial hyperspectral image $X_0$; and 2) inputting the initial hyperspectral image $X_0$ into a pre-trained deep convolutional neural network guided by an imaging model, and conducting iteration computation to obtain a hyperspectral image X.

In this embodiment, generalized inverse upsampling is conducted on the input RGB image Y with a spectral response function to obtain the initial hyperspectral image $X_0$; and a function expression of the initial hyperspectral image $X_0$ obtained by generalized inverse upsampling on the input RGB image Y with the spectral response function is as follows:

$$X_0 = R^\dagger * Y \qquad (1)$$

In the above expression, $R^\dagger$ is a generalized inverse of the spectral response function R.

As shown in FIG. 1, in the step 2), the deep convolutional neural network guided by the imaging model is formed by a plurality of modules of a same structure; the plurality of modules are in cascade connection; input of each module comprises the initial hyperspectral image $X_0$ and an upsampling result of a previous module or the initial hyperspectral image $X_0$; and the hyperspectral image X is obtained from output of the last module. The deep convolutional neural network has the advantage of light model. Each module is formed by a hyperspectral prior learning (HPL) module and an imaging model guidance (IMG) module; each hyperspectral prior learning (HPL) module is used for learning prior features of the upsampling result of the previous module or the initial hyperspectral image $X_0$; each imaging model guidance (IMG) module is used for optimizing the learned features based on the input initial hyperspectral image $X_0$ and the prior features output by the hyperspectral prior learning (HPL) module according to the imaging model.

Figure 2:
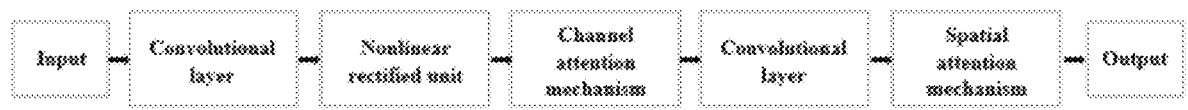
FIG. 2 is a principle diagram of a hyperspectral prior learning module proposed according to an embodiment of the present invention.

Each hyperspectral prior learning (HPL) module is used for learning the prior features of the upsampling result of the previous module or the initial hyperspectral image $X_0$. As shown in FIG. 2, each hyperspectral prior learning (HPL) module in this embodiment is of a five-layer structure formed by sequentially connecting a 3×3 first convolutional layer, a nonlinear rectified linear unit, a channel attention mechanism, a 3×3 second convolutional layer and a spatial attention mechanism; each channel attention mechanism comprises a 1×1 convolutional operation, a nonlinear normalization unit, a linear arithmetic operation and a plurality of rectified linear units; and the 1×1 convolutional operation, the nonlinear normalization unit, the linear arithmetic operation and the plurality of rectified linear units are sequentially connected, wherein the third layer is the channel attention mechanism used for learning the spectral characteristics of the hyperspectral image; and the last layer is the spatial attention mechanism used for learning the spatial characteristics of the hyperspectral image.

The foregoing deep convolutional neural network guided by the imaging model is a hyperspectral imaging model established in this embodiment, quantitatively describes a relationship between the RGB image and the hyperspectral image, uses the maximum a posteriori probability principle, decomposes the hyperspectral imaging problem into two subproblems to be alternately solved and solves the two subproblems by designing a hyperspectral prior learning module and an imaging model guidance module respectively, thereby effectively reconstructing the hyperspectral image from the RGB image and lowering the obtaining cost of the hyperspectral image. In this embodiment, in the step 2), the step of conducting iteration computation to obtain the hyperspectral image X comprises:

2.1) Initializing a number of iterations to be 1 and values of parameters in the deep convolutional neural network guided by the imaging model and a penalty factor $\mu_t$ of a $t^{th}$ iteration.

2.2) Learning the prior features of the upsampling result of the previous module or the initial hyperspectral image $X_0$ by the hyperspectral prior learning (HPL) module in the $t^{th}$ module firstly, optimizing the learned features based on the input initial hyperspectral image $X_0$ and the prior features output by the hyperspectral prior learning (HPL) module according to the imaging model by the imaging model guidance (IMG) module, and updating the hyperspectral image X obtained by the $t^{th}$ iteration.

2.3) Judging whether the condition that the number t of iterations is equal to a preset threshold T is satisfied or not; if the condition is satisfied, outputting the hyperspectral image X obtained by the $t^{th}$ iteration as a final result; or otherwise, adding 1 to the number t of iterations, and jumping to execute the step 2.2) for continuous iteration.

In this embodiment, the hyperspectral prior learning (HPL) module learns the prior features of the upsampling result of the previous module or the initial hyperspectral image $X_0$, which means that: a variable G is introduced and is updated by executing the expressions (3)-(4) to learn the upsampling result of the previous module or the initial hyperspectral image $X_0$.

$$G_{t+1} = \mathrm{argmin}_G \lambda \varnothing(G) + \mu_t \|G - X_t\|_F^2 \qquad (2)$$

$$X_{t+1} = \mathrm{argmin}_X \|Y - FX\|_F^2 + \mu_{t+1} \|G_{t+1} - X\|_F^2 \qquad (3)$$

$$\mu_{t+1} = \gamma \mu_t \qquad (4)$$

In the expressions, $G_{t+1}$ is a value of the introduced variable in $t+1^{th}$ iteration; G is the introduced variable; $\lambda$ is a weighting parameter; $\varnothing(G)$ is a regularization term of the introduced variable G; $\mu_t$ is a penalty factor of $t^{th}$ iteration; $X_{t+1}$ is a penalty factor of $t+1^{th}$ iteration; $X_t$ is a hyperspectral image obtained by the $t^{th}$ iteration; $X_{t+1}$ is a hyperspectral image obtained by the $t+1^{th}$ iteration; Y represents an RGB image; F is a spectral response function; X represents a hyperspectral image; and $\gamma$ is an update coefficient of the penalty factor. Updating the variable G according to the expression (2) specifically refers to considering the expression (3) as an image denoising problem from regularization of image prior information. This embodiment uses the deep convolutional neural network to solve the problem; and the module is called as a hyperspectral prior learning (HPL) module. The hyperspectral image contains rich spectra and spatial information; and therefore, we propose a channel attention mechanism to learn the spectral information of the hyperspectral image and use the spatial attention mechanism to learn the spatial information of the hyperspectral image.

In this embodiment, a function expression that each hyperspectral prior learning (HPL) module is used for optimizing the learned features based on the input initial hyperspectral image $X_0$ and the prior features output by the hyperspectral prior learning (HPL) module according to the imaging model is as follows:

$$X_{t+1} = (F^T F + \mu_t I)^{-1}(F^T Y + \mu_t G_{t+1}) \qquad (5)$$

In the expression, $X_{t+1}$ is a result obtained by optimizing the learned features according to the imaging model; F is the spectral response function; I is a unit matrix, Y is the input RGB image; $\mu_t$ is a penalty factor in the $t^{th}$ iteration; and $G_{t+1}$ is a value of the introduced variable in the $t+1^{th}$ iteration. Updating $X_{t+1}$ as the hyperspectral image obtained by the $t+1^{th}$ iteration according to the expression (3) specifically refers to considering the expression (3) to have a strongly-convex problem with an analytical solution and an analytical solution shown in the expression (5). In this embodiment, the imaging model guidance (IMG) module uses a matrix multiplication to execute the forgoing expression (5) to obtain the analytical solution of the strongly-convex problem.

This embodiment further comprises the steps of establishing a plurality of subproblem solution models shown as the expressions (3)-(4) in advance:

S1) establishing a linear mapping relationship between the hyperspectral image X and the traditional RGB image Y:

(6)

In the above expression, F is a spectral response matrix.

S2) According to a Bayes formula and maximum a posteriori, the estimation problem for the hyperspectral image is converted to a basic model in a following expression:

$$X = \mathrm{argmax}_x P(X|Y) \quad (7)$$

$$X = \mathrm{argmin}_x - \log\{P(X|Y)\} - \log\{P(X)\} \quad (8)$$

$$-\log\{P(Y|X)\} = \frac{1}{2\sigma^2}\|FX - Y\|_F^2 \quad (9)$$

$$-\log\{P(X)\} = \lambda\phi(X) \quad (10)$$

In the above expressions. P(X|Y) is a possibility that X occurs under the condition of occurrence of Y; P(Y|X) is a possibility that Y occurs under the condition of occurrence of X; σ is a variance of noise; λ is a weighting parameter (larger than 0); and φ(X) is a regularization term of a to-be-estimated hyperspectral image X.

S3) Introducing the variable G=X, wherein X is the to-be-estimated hyperspectral image; and establishing an exterior penalty function L(X,G) required to be optimized;

$$L(X,G) = \|Y - FX\|_F^2 + \lambda\phi(X) + \mu\|G - X\|_F^2 \quad (11)$$

In the above expression, p is the penalty factor.

S4) Transforming and decomposing the exterior penalty function L(X,G) requiring to be optimized to obtain a multi-subproblem solution model shown as the expressions (3)-(4).

Figure 3:
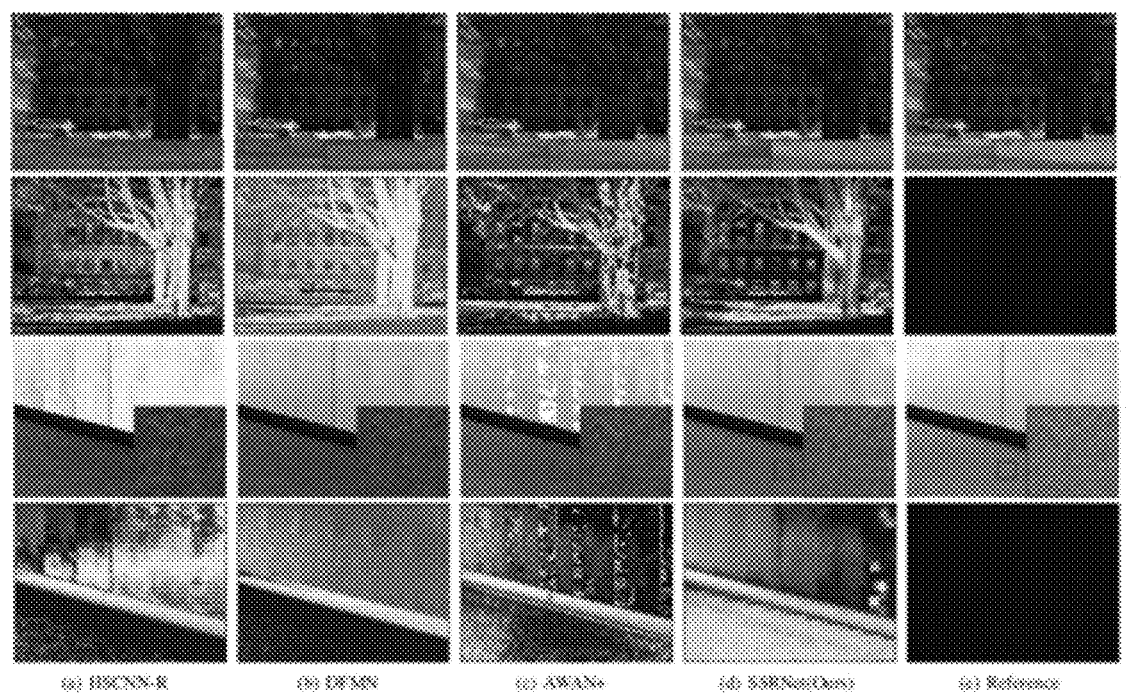
FIG. 3 is a result comparison diagram of a method according to an embodiment of the present invention and four imaging methods on a Harvard hyperspectral image.
Figure 4:
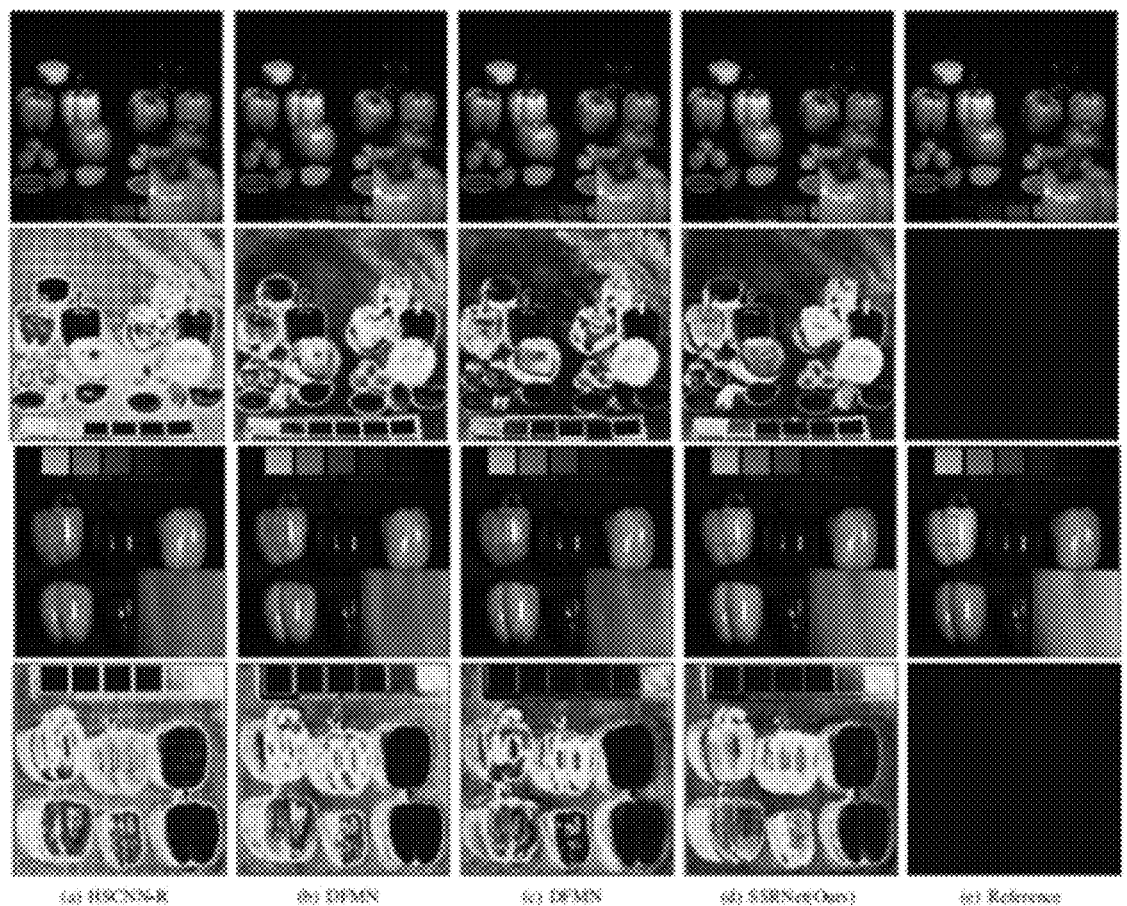
FIG. 4 is a result comparison diagram of a method according to an embodiment of the present invention and four imaging methods on a CAVE hyperspectral image.

In order to verify the method according to this embodiment, in this embodiment, an image with a number of wavebands of 31 and a spatial size of 512×512 in a CAVE public data set and an image with a number of wavebands of 31 and a spatial size of 1392×1040 in a Harvard public data set are used for a verification experiment. In the experiment, the images serve as the high-resolution hyperspectral images, further serve as input images with the corresponding RGB images together and are obtained by downsampling through the spectral response function. In the actual process, in the CAVE data set, 20 hyperspectral images are randomly selected as a training set, and 12 hyperspectral images are randomly selected as a test set; and in the Harvard data set, 35 hyperspectral images are randomly selected as a training set, and 15 hyperspectral images are randomly selected as a test set. Also, 4 kinds of typical hyperspectral imaging methods are compared. FIG. 3 is a result comparison diagram of the method according to this embodiment of the present invention and four typical imaging methods on the Harvard hyperspectral images. FIG. 4 is a result comparison diagram of the method according to this embodiment of the present invention and four imaging methods on the CAVE hyperspectral images, wherein 4 kinds of evaluation indexes for fusion images are provided, including spectral angle mapping (SAM), root mean square error (RMSE), unified image quality index (UIQI) and structural similarity (SSIM); and wherein the larger the values of the UIQI and the SSIM are, the better the quality of each image is; and the larger the values of the SAM and RMSE are, showing that the poorer the quality of each high-resolution image is. A table shown in FIG. 5 shows objective evaluation indexes of 4 kinds of typical fusion methods (Arad, HSCNN-R, DFMN, AWAN+) and the method (SSRNet) proposed in this embodiment for imaging experiments on the CAVE data set. A table shown in FIG. 6 shows objective evaluation indexes of 4 kinds of typical fusion methods (Arad, HSCNN-R, DFMN, AWAN+) and the method (SSRNet) proposed in this embodiment for imaging experiments on the Harvard data set. From FIG. 5 and FIG. 6, all the objective evaluation indexes in the method (SSRNet) of this embodiment are superior to those in other methods, the reason for which is that the method (SSRNet) of this embodiment uses an image guidance model unit, which better optimizes parameters of the model. More importantly, the used deep convolutional neural network can well learn image prior knowledge and save spatial details of the images.

To sum up, the method in this embodiment uses the strong learning ability of the deep convolutional neural network and the spectral-superresolution imaging model and can improve the imaging precision and efficiency at the same time. Firstly, each RGB image is subjected to upsampling with a Moore-Penrose pseudo-inverse method; upsampled images and RGB images are overlaid by using a dense fusion strategy to serve as an input, so as to guide that due to high relevance between spectral bands and low rank characteristic of a spectral dimension, a channel attention block is firstly used to obtain the relevance between spectral bands of the hyperspectral images. Then, by using prior knowledge of space similarity of the spectral images, non-local spatial similarity of the hyperspectral images is obtained by using the nonlocal similarity, and then the hyperspectral images are reconstructed. The mentioned above in this embodiment is called as a spectral prior learning module. Then, based on the established spectral imaging model and the deep convolutional neural network, image features learned by the spectral prior learning module is optimized; and therefore, prior information learned from the images can be fully used. Whole estimation of the hyperspectral images uses a half quadratic splitting algorithm for continuous iterations, and finally, the high-resolution hyperspectral image is obtained. By comparing with other high-performance rapid hyperspectral imaging method, the rapid hyperspectral imaging method of this embodiment may obtain the hyperspectral image with higher quality, and the method in this paper is little in memory consumption and lower in requirement for hardware.

In addition, this embodiment further provides a high-resolution hyperspectral computational imaging system, comprising a microprocessor and a memory which are connected to each other; the microprocessor is programmed or configured to execute the steps of the forgoing high-resolution hyperspectral computational imaging method; or the microprocessor is programmed or configured to execute the steps of the forgoing high-resolution hyperspectral computational imaging method with a neural network acceleration processor together.

In addition, this embodiment further provides a computer readable storage medium, and computer programs programmed or configured to execute the high-resolution hyperspectral computational imaging method are stored in the computer readable storage medium.

Those skilled in the art should understand that the embodiments of this application may be provided as a method, a system or products of computer programs. Therefore, this application may be in the form of full hardware embodiments, full software embodiments, or a combination thereof. Moreover, this application may employ the form of the products of the computer programs implemented on one or more computer readable storage media containing computer available program codes (including, but not limited to, a disk memory, CD-ROM and an optical memory). This application is described with reference to flow charts and/or block diagrams of the method, equipment (system) and the products of the computer programs according to the embodiment of this application. It should be understood that instructions of the computer programs implement each flow and/or block in the flow charts and/or block diagrams and combination thereof. These instructions of the computer programs may be provided a general-purpose computer, a specialized computer, an embedded processor or a processor of other programmable data processing equipment, so as to give rise to a machine with the result that the instructions executed through the computer or processor of other programmable data processing equipment give rise to a device that is used for realizing functions designated by one or more processes in a flow chart and/or one or more blocks in a block diagram. These instructions of the computer program may also be stored in a computer-readable memory that can direct the computer or other programmable data processing equipment to function in a particular manner, such that the instructions stored in the computer-readable memory produce an article of manufacture including instruction devices for implementing the functions designated by one or more processes in a flow chart and/or one or more blocks in a block diagram. These instructions of the computer programs may also be loaded on the computer or other programmable data processing equipment so as to carry out a series of operation steps on the computer or other programmable equipment to generate processing to be achieved by the computer, so that the instructions to be executed by the computer or other programmable equipment provide the steps for implementing the functions designated by one or more processes in a flow chart and/or one or more blocks in a block diagram.

The above disclosure is preferred embodiments of the present invention only, the protection scope of the present invention is not limited to the above described embodiments only, and all the technical solutions within the spirit of the present invention should be within the protection scope of the present invention. For ordinary skilled in the art, it should be noted that a plurality of improvements and embellishments without departing from the principle of the present invention should all be regarded as within the protection scope of the present invention.

What is claimed is:

1. A high-resolution hyperspectral computational imaging method, comprising:
   1) conducting spectral upsampling on an input RGB image Y to obtain an initial hyperspectral image $X_0$; and
   2) inputting the initial hyperspectral image $X_0$ into a pre-trained deep convolutional neural network guided by an imaging model, and conducting iteration computation to obtain a hyperspectral image X, wherein in the step 2), the deep convolutional neural network guided by an imaging model is formed by a plurality of modules of a same structure; the plurality of modules are in cascade connection; input of each module comprises the initial hyperspectral image $X_0$ and an upsampling result of a previous module or the initial hyperspectral image $X_0$; and the hyperspectral image X is obtained from output of the last module,
   wherein each module comprises a hyperspectral prior learning (HPL) module and an imaging model guidance (IMG) module, the HPL module is used for learning prior features of the upsampling result of the previous module or the initial hyperspectral image X0, and the IMG module is used for optimizing the learned features based on the input initial hyperspectral image X0 and the prior features output by the HPL module according to the imaging model,
   the HPL module is of a five-layer structure formed by sequentially connecting a 3×3 first convolutional layer, a nonlinear rectified linear unit, a channel attention mechanism, a 3×3 second convolutional layer and a spatial attention mechanism, each channel attention mechanism comprises a 1×1 convolutional operation, a nonlinear normalization unit, a linear arithmetic operation and a plurality of rectified linear units, and the 1×1 convolutional operation, the nonlinear normalization unit, the linear arithmetic operation and the plurality of rectified linear units are sequentially connected.

2. The high-resolution hyperspectral computational imaging method according to claim 1, wherein in the step 1), a function expression of the initial hyperspectral image $X_0$ obtained by spectral upsampling on the input RGB image Y is:

$$X_0 = R^\dagger * Y \qquad (1)$$

in the above expression, $R^\dagger$ is a generalized inverse of a spectral response function R.

3. The high-resolution hyperspectral computational imaging method according to claim 1, wherein in the step 2), the step of conducting iteration computation to obtain the hyperspectral image X comprises:
   2.1) initializing a number of iterations to be 1 and values of parameters in the deep convolutional neural network guided by the imaging model and a penalty factor $\mu_t$ of a $t^{th}$ iteration;
   2.2) learning the prior features of the upsampling result of the previous module or the initial hyperspectral image $X_0$ by the hyperspectral prior learning (HPL) module in the $t^{th}$ module firstly, optimizing the learned features based on the input initial hyperspectral image $X_0$ and the prior features output by the HPL module according to the imaging model by the IMG module, and updating the hyperspectral image X obtained by the $t^{th}$ iteration;
   2.3) judging whether the condition that the number t of iterations is equal to a preset threshold T is satisfied or not; if the condition is satisfied, outputting the hyperspectral image X obtained by the $t^{th}$ iteration as a final result; or otherwise, adding 1 to the number t of iterations, and jumping to execute the step 2.2) for continuous iteration.

4. The high-resolution hyperspectral computational imaging method according to claim 1, wherein the HPL module learns the prior features of the upsampling result of the previous module or the initial hyperspectral image $X_0$, through the following steps:
   a variable G is introduced and is updated by executing the expressions (3)-(4) to learn the upsampling result of the previous module or the initial hyperspectral image $X_0$, $$G_{t+1} = \mathrm{argmin}_G \lambda \varnothing(G) + \mu_t \|G - X_t\|_F^2 \qquad (2)$$

$$X_{t+1} = \mathrm{argmin}_X \|Y - FX\|_F^2 + \mu_t \|G_{t+1} - X\|_F^2 \qquad (3)$$

$$\mu_{t+1} = \gamma \mu_t \qquad (4)$$

in the expressions, $G_{t+1}$ is a value of the introduced variable in t+1th iteration; G is the introduced variable; λ is a weighting parameter; Ø (G) is a regularization term of the introduced variable G; $\mu_t$ is a penalty factor of $t^{th}$ iteration; $\mu_{t+1}$ is a penalty factor of $t+1^{th}$ iteration; $X_t$ is a hyperspectral image obtained by the $t^{th}$ iteration; $X_{t+1}$ is a hyperspectral image obtained by the $t+1^{th}$ iteration; Y represents an RGB image; F is a spectral response function; X represents a hyperspectral image; and γ is an update coefficient of the penalty factor.

5. The high-resolution hyperspectral computational imaging method according to claim 4, wherein a function expression that each HPL module is used for optimizing the learned features based on the input initial hyperspectral image $X_0$ and the prior features output by the HPL module according to the imaging model is:

$$X_{t+1}=(F^TF+\mu_t I)^{-1}(F^TY+\mu_t G_{t+1}) \quad (5)$$

in the expression, $X_{t+1}$ is a result obtained by optimizing the learned features according to the imaging model; F is the spectral response function; I is a unit matrix, Y is the input RGB image; $\mu_t$ is a penalty factor in the $t^{th}$ iteration; and $G_{t+1}$ is a value of the introduced variable in the $t+1^{th}$ iteration.

6. A high-resolution hyperspectral computational imaging system, comprising a microprocessor and a memory which are connected to each other, wherein the microprocessor is programmed or configured to execute the steps of the high-resolution hyperspectral computational imaging method of claim 1.

7. A non-transitory computer readable storage medium, wherein computer programs programmed or configured to execute the high-resolution hyperspectral computational imaging method of claim 1 is stored in the computer readable storage medium.

8. A high-resolution hyperspectral computational imaging method, comprising:
1) Conducting spectral upsampling on an input RGB image Y to obtain an initial hyperspectral image $X_0$; and
2) Inputting the initial hyperspectral image $X_0$ into a pre-trained deep convolutional neural network guided by an imaging model, and conducting iteration computation to obtain a hyperspectral image X, wherein in the step 2), the deep convolutional neural network guided by an imaging model is formed by a plurality of modules of a same structure; the plurality of modules are in cascade connection; input of each module comprises the initial hyperspectral image $X_0$ and an upsampling result of a previous module or the initial hyperspectral image $X_0$;
and the hyperspectral image X is obtained from output of the last module, wherein each module comprises a hyperspectral prior learning (HPL) module and an imaging model guidance (IMG) module, the HPL module is used for learning prior features of the upsampling result of the previous module or the initial hyperspectral image $X_0$, and the IMG module is used for optimizing the learned features based on the input initial hyperspectral image $X_0$ and the prior features output by the HPL module according to the imaging model, wherein in the step 2), the step of conducting iteration computation to obtain the hyperspectral image X comprises:
2.1) initializing a number of iterations to be 1 and values of parameters in the deep convolutional neural network guided by the imaging model and a penalty factor $\mu_t$ of a $t^{th}$ iteration;
2.2) learning the prior features of the upsampling result of the previous module or the initial hyperspectral image $X_0$ by the HPL module in the $t^{th}$ module firstly, optimizing the learned features based on the input initial hyperspectral image $X_0$ and the prior features output by the HPL module according to the imaging model by the IMG module, and updating the hyperspectral image X obtained by the $t^{th}$ iteration;
2.3) judging whether the condition that the number t of iterations is equal to a preset threshold T is satisfied or not; if the condition is satisfied, outputting the hyperspectral image X obtained by the $t^{th}$ iteration as a final result; or otherwise, adding 1 to the number t of iterations, and jumping to execute the step 2.2) for continuous iteration.

9. The high-resolution hyperspectral computational imaging method according to claim 8, wherein in the step 1), a function expression of the initial hyperspectral image $X_0$ obtained by spectral upsampling on the input RGB image Y is:

$$X_0=R^{\dagger}*Y \quad (1)$$

in the above expression, $R^{\dagger}$ is a generalized inverse of a spectral response function R.

10. The high-resolution hyperspectral computational imaging method according to claim 8, wherein the HPL module is of a five-layer structure formed by sequentially connecting a 3×3 first convolutional layer, a nonlinear rectified linear unit, a channel attention mechanism, a 3×3 second convolutional layer and a spatial attention mechanism, each channel attention mechanism comprises a 1×1 convolutional operation, a nonlinear normalization unit, a linear arithmetic operation and a plurality of rectified linear units, and the 1×1 convolutional operation, the nonlinear normalization unit, the linear arithmetic operation and the plurality of rectified linear units are sequentially connected.

11. The high-resolution hyperspectral computational imaging method according to claim 10, wherein the HPL module learns the prior features of the upsampling result of the previous module or the initial hyperspectral image $X_0$ through the following steps:
a variable G is introduced and is updated by executing the expressions (3)-(4) to learn the upsampling result of the previous module or the initial hyperspectral image $X_0$, $$G_{t+1}=\mathrm{argmin}_G \lambda \varnothing(G)+\mu_t\|G-X_t\|_F^2 \quad (2)$$

$$X_{t+1}=\mathrm{argmin}_X\|Y-FX\|_F^2+\mu_t\|G_{t+1}-X\|_F^2 \quad (3)$$

$$\mu_{t+1}=\gamma\mu_t \quad (4)$$

in the expressions, $G_{t+1}$ is a value of the introduced variable in $t+1^{th}$ iteration; G is the introduced variable; $\lambda$ is a weighting parameter; Ø (G) is a regularization term of the introduced variable G; $\mu_t$ is a penalty factor of $t^{th}$ iteration; $\mu_{t+1}$ is a penalty factor of $t+1^{th}$ iteration; $X_t$ is a hyperspectral image obtained by the $t^{th}$ iteration; $X_{t+1}$ is a hyperspectral image obtained by the $t+1^{th}$ iteration; Y represents an RGB image; F is a spectral response function; X represents a hyperspectral image; and $\gamma$ is an update coefficient of the penalty factor.

12. The high-resolution hyperspectral computational imaging method according to claim 11, wherein a function expression that each HPL module is used for optimizing the learned features based on the input initial hyperspectral image $X_0$ and the prior features output by the hyperspectral prior learning (HPL) module according to the imaging model is:

$$X_{t+1}=(F^TF+\mu_t I)^{-1}(F^TY+\mu_t G_{t+1}) \quad (5)$$

in the expression, $X_{t+1}$ is a result obtained by optimizing the learned features according to the imaging model; F is the spectral response function; I is a unit matrix, Y is the input RGB image; $\mu_t$ is a penalty factor in the $t^{th}$ iteration; and $G_{t+1}$ is a value of the introduced variable in the $t+1^{th}$ iteration.

13. A high-resolution hyperspectral computational imaging system, comprising a microprocessor and a memory which are connected to each other, wherein the microprocessor is programmed or configured to execute the steps of the high-resolution hyperspectral computational imaging method of claim 8.

14. A non-transitory computer readable storage medium, wherein computer programs programmed or configured to execute the high-resolution hyperspectral computational imaging method of claim 8 is stored in the computer readable storage medium.

15. A high-resolution hyperspectral computational imaging method, comprising:
   1) Conducting spectral upsampling on an input RGB image Y to obtain an initial hyperspectral image $X_0$; and
   2) Inputting the initial hyperspectral image $X_0$ into a pre-trained deep convolutional neural network guided by an imaging model, and conducting iteration computation to obtain a hyperspectral image X, wherein in the step 2), the deep convolutional neural network guided by an imaging model is formed by a plurality of modules of a same structure; the plurality of modules are in cascade connection; input of each module comprises the initial hyperspectral image $X_0$ and an upsampling result of a previous module or the initial hyperspectral image $X_0$; and the hyperspectral image X is obtained from output of the last module,
   wherein each module comprises a hyperspectral prior learning (HPL) module and an imaging model guidance (IMG) module, the HPL module is used for learning prior features of the upsampling result of the previous module or the initial hyperspectral image X0, and the IMG module is used for optimizing the learned features based on the input initial hyperspectral image X0 and the prior features output by the HPL module according to the imaging model,
   wherein the HPL module learns the prior features of the upsampling result of the previous module or the initial hyperspectral image $X_0$ through the following steps:
   a variable G is introduced and is updated by executing the expressions (3)-(4) to learn the upsampling result of the previous module or the initial hyperspectral image $X_0$, $$G_{t+1}=\mathrm{argmin}_G \lambda\varnothing(G)+\mu_t\|G-X_t\|_F^2 \quad (2)$$

$$X_{t+1}=\mathrm{argmin}_X\|Y-FX\|_F^2+\mu_t\|G_{t+1}-X\|_F^2 \quad (3)$$

$$\mu_{t+1}=\gamma\mu_t \quad (4)$$

in the expressions, $G_{t+1}$ is a value of the introduced variable in $t+1^{th}$ iteration; G is the introduced variable; λ is a weighting parameter; ø (G) is a regularization term of the introduced variable G; $\mu_t$ is a penalty factor of $t^{th}$ iteration; $\mu_{t+1}$ is a penalty factor of $t+1^{th}$ iteration; $X_t$ is a hyperspectral image obtained by the $t^{th}$ iteration; $X_{t+1}$ is a hyperspectral image obtained by the $t+1^{th}$ iteration; Y represents an RGB image; F is a spectral response function; X represents a hyperspectral image; and γ is an update coefficient of the penalty factor, and
wherein a function expression that each HPL module is used for optimizing the learned features based on the input initial hyperspectral image $X_0$ and the prior features output by the hyperspectral prior learning (HPL) module according to the imaging model is:

$$X_{t+1}=(F^TF+\mu_t I)^{-1}(F^TY+\mu_t G_{t+1}) \quad (5)$$

in the expression, $X_{t+1}$ is a result obtained by optimizing the learned features according to the imaging model; F is the spectral response function; I is a unit matrix, Y is the input RGB image; $\mu_t$ is a penalty factor in the $t^{th}$ iteration; and $G_{t+1}$ is a value of the introduced variable in the $t+1^{th}$ iteration.

16. The high-resolution hyperspectral computational imaging method according to claim 15, wherein in the step 1), a function expression of the initial hyperspectral image $X_0$ obtained by spectral upsampling on the input RGB image Y is:

$$X_0=R^{\dagger}*Y \quad (1)$$

in the above expression, $R^{\dagger}$ is a generalized inverse of a spectral response function R.

17. The high-resolution hyperspectral computational imaging method according to claim 15, wherein the HPL module is of a five-layer structure formed by sequentially connecting a 3×3 first convolutional layer, a nonlinear rectified linear unit, a channel attention mechanism, a 3×3 second convolutional layer and a spatial attention mechanism, each channel attention mechanism comprises a 1×1 convolutional operation, a nonlinear normalization unit, a linear arithmetic operation and a plurality of rectified linear units, and the 1×1 convolutional operation, the nonlinear normalization unit, the linear arithmetic operation and the plurality of rectified linear units are sequentially connected.

18. The high-resolution hyperspectral computational imaging method according to claim 15, wherein in the step 2), the step of conducting iteration computation to obtain the hyperspectral image X comprises:
   2.1) initializing a number of iterations to be 1 and values of parameters in the deep convolutional neural network guided by the imaging model and a penalty factor μr of a $t^{th}$ iteration;
   2.2) learning the prior features of the upsampling result of the previous module or the initial hyperspectral image $X_0$ by the HPL module in the $t^{th}$ module firstly, optimizing the learned features based on the input initial hyperspectral image $X_0$ and the prior features output by the HPL module according to the imaging model by the IMG module, and updating the hyperspectral image X obtained by the $t^{th}$ iteration;
   2.3) judging whether the condition that the number t of iterations is equal to a preset threshold T is satisfied or not; if the condition is satisfied, outputting the hyperspectral image X obtained by the $t^{th}$ iteration as a final result; or otherwise, adding 1 to the number t of iterations, and jumping to execute the step 2.2) for continuous iteration.

19. A high-resolution hyperspectral computational imaging system, comprising a microprocessor and a memory which are connected to each other, wherein the microprocessor is programmed or configured to execute the steps of the high-resolution hyperspectral computational imaging method of claim 5.

20. A non-transitory computer readable storage medium, wherein computer programs programmed or configured to execute the high-resolution hyperspectral computational imaging method of claim 15 is stored in the computer readable storage medium.

* * * * *